(12) United States Patent
Henry

(10) Patent No.: US 11,573,318 B1
(45) Date of Patent: Feb. 7, 2023

(54) COVERT DISTANCE DETERMINATION VIA MILLIMETER WAVE PROXIMITY SENSOR

(71) Applicant: Rockwell Collins, Inc., Cedar Rapids, IA (US)

(72) Inventor: Daniel J. Henry, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 538 days.

(21) Appl. No.: 16/594,991

(22) Filed: Oct. 7, 2019

(51) Int. Cl.
| | |
|---|---|
| *G01S 13/933* | (2020.01) |
| *G01S 13/58* | (2006.01) |
| *B64D 39/00* | (2006.01) |
| *G01S 7/04* | (2006.01) |

(52) U.S. Cl.
CPC ............. *G01S 13/933* (2020.01); *B64D 39/00* (2013.01); *G01S 7/04* (2013.01); *G01S 13/584* (2013.01)

(58) Field of Classification Search
CPC ........ G01S 13/933; G01S 7/04; G01S 13/584; B64D 39/00
See application file for complete search history.

(56) References Cited

U.S. PATENT DOCUMENTS

| | | | | |
|---|---|---|---|---|
| 4,170,773 A | * | 10/1979 | Fitzsimmons | G01S 13/42 342/42 |
| 6,966,525 B1 | * | 11/2005 | Schroeder | B64D 39/00 244/135 A |
| 9,150,310 B1 | * | 10/2015 | Bray | B64D 39/00 |
| 9,150,311 B2 | * | 10/2015 | Rix | B64D 39/04 |
| 2003/0122701 A1 | * | 7/2003 | Tran | G08G 5/045 342/36 |
| 2006/0175464 A1 | * | 8/2006 | Chang | F42B 12/32 244/3.15 |
| 2009/0002220 A1 | * | 1/2009 | Lovberg | G01S 13/935 342/33 |
| 2018/0016026 A1 | * | 1/2018 | Carlson | G05D 1/104 |
| 2018/0173246 A1 | * | 6/2018 | Crockett | G05D 1/104 |

FOREIGN PATENT DOCUMENTS

| | | | | |
|---|---|---|---|---|
| DE | 3440812 A1 | * | 5/1986 | |
| JP | H1164488 A | * | 3/1999 | |
| JP | 2001108745 A | * | 4/2001 | |
| JP | 2001124843 A | * | 5/2001 | |

* cited by examiner

*Primary Examiner* — Matthew M Barker
(74) *Attorney, Agent, or Firm* — Suiter Swantz pc llo

(57) ABSTRACT

A situational awareness system for aerial refueling is disclosed. In embodiments, the situational awareness system may include one or more millimeter wave devices of a tanker aircraft configured to transmit one or more emitter signals toward an aircraft to be refueled, and receive one or more reflected signals reflected from the aircraft to be refueled. In embodiments, the situational awareness system further includes a controller communicatively coupled to the one or more millimeter wave devices and the display device, the controller configured to determine a distance between a refueling assembly of the tanker aircraft and the aircraft to be refueled based on the one or more reflected signals, and generate one or more control signals configured to cause a display substrate of a display device to display at least one of a metric or image indicative of the determined distance.

13 Claims, 6 Drawing Sheets

COVERT DISTANCE DETERMINATION VIA MILLIMETER WAVE PROXIMITY SENSOR

BACKGROUND

Tasks and operations which require accurate three-dimensional (3D) depth perception often lack sufficient 3D cues to perform the task/operation efficiently and safely. In particular, conventional systems for providing 3D depth perception typically suffer from low contrast, detrimental shadowing effects, and obscurations. Systems capable of providing accurate 3D depth perception data are required in a variety of applications, including airborne refueling, robotics applications, and docking spacecraft.

In the context of aircraft and airborne/aerial refueling, systems are required to determine distance and closure rate between an armature of a tanker aircraft and an aircraft to be refueled (e.g., receptacle of the aircraft to be refueled). For example, distances and closure rates between a tanker aircraft and an aircraft to be refueled may be directly measured using a variety of active emitter techniques, including light detection and ranging (LIDAR), radar, laser radar, and the like. However, these conventional techniques suffer from significant size, weight, power, and cost impacts. Additionally, these active emitter techniques are easily detectible, and are therefore not suitable for covert, emissions control (EMCON) operations.

Therefore, it would be desirable to provide a system and method which cure one or more of the shortfalls of the previous approaches identified above.

SUMMARY

A situational awareness system for aerial refueling is disclosed. In embodiments, the situational awareness system may include one or more millimeter wave devices of a tanker aircraft. The one or more millimeter wave devices may be configured to transmit one or more emitter signals toward an aircraft to be refueled, and receive one or more reflected signals reflected from the aircraft to be refueled. In embodiments, the situational awareness system further includes a display device disposed within the tanker aircraft, the display device including a display substrate configured to display one or more images. In embodiments, the situational awareness system further includes a controller communicatively coupled to the one or more millimeter wave devices and the display device, the controller configured to determine a distance between a refueling assembly of the tanker aircraft and the aircraft to be refueled based on the one or more reflected signals, and generate one or more control signals configured to cause the display substrate to display at least one of a metric or image indicative of the determined distance.

In some embodiments of the situational awareness system, the one or more emitter signals include an emitter signal frequency corresponding to an atmospheric attenuation frequency of a surrounding environment of the tanker aircraft.

In some embodiments of the situational awareness system, the one or more emitter signals include an emitter signal frequency comprising at least one of an absorption frequency of oxygen ($O_2$) or an absorption frequency of water vapor ($H_2O$).

In some embodiments of the situational awareness system, the controller is further configured to: receive one or more sensor readings indicative of one or more characteristics of a surrounding environment of the tanker aircraft; determine an output power of the one or more emitter signals, based on the one or more sensor readings; and generate one or more control signals configured to cause the one or more millimeter wave devices to transmit the one or more emitter signals with the determined output power.

In some embodiments of the situational awareness system, the one or more sensor readings are acquired by one or more sensors disposed on the tanker aircraft.

In some embodiments of the situational awareness system, the one or more characteristics of the surrounding environment include at least one of a temperature, a pressure, a composition, a water vapor density, or an atmospheric absorption metric.

In some embodiments of the situational awareness system, determining an output power of the one or more emitter signals comprises determining an output power configured to cause the one or more emitter signals to exhibit a power level below a selected power level threshold beyond a selected distance from the tanker aircraft.

In some embodiments of the situational awareness system, the controller is further configured to: receive one or more input commands from a user input device; and generate one or more control signals configured to cause the one or more millimeter wave devices to selectively adjust an output power of the one or more emitter signals.

In some embodiments of the situational awareness system, the controller is further configured to: determine a closure rate between the tanker aircraft and the aircraft to be refueled based on the one or more reflected signals; and generate one or more control signals configured to cause the display substrate to display at least one of a metric or image indicative of the determined closure rate.

In some embodiments of the situational awareness system, the refueling assembly is configured to deliver fuel from the tanker aircraft to a receptacle of the aircraft to be refueled.

In some embodiments of the situational awareness system, the controller is further configured to: generate one or more control signals configured to cause one or more actuators to actuate at least a portion of the refueling assembly based at least in part on the determined distance.

In some embodiments of the situational awareness system, the one or more millimeter wave devices include a scanning millimeter wave sensor.

In some embodiments of the situational awareness system, the one or more millimeter wave devices are coupled to a fuselage of the tanker aircraft.

In some embodiments of the situational awareness system, the refueling assembly comprises an armature, and the one or more millimeter wave devices are coupled to at least one of an armature body or a distal end of the armature.

A situational awareness system is disclosed. In embodiments, the situational awareness system includes one or more millimeter wave devices of an aircraft, the one or more millimeter wave devices configured to transmit one or more emitter signals toward an object of interest, and receive one or more reflected signals reflected from the object of interest. The situational awareness system may further include a controller communicatively coupled to the one or more millimeter wave devices, the controller including one or more processors and a memory, the one or more processors configured to: determine a distance between the aircraft the object of interest based on the one or more reflected signals; determine a closure rate between the aircraft the object of interest based on the one or more reflected signals; and generate one or more control signals configured to cause a display substrate to display at least one of a metric or image indicative of the determined distance and the determined closure rate.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are provided for example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
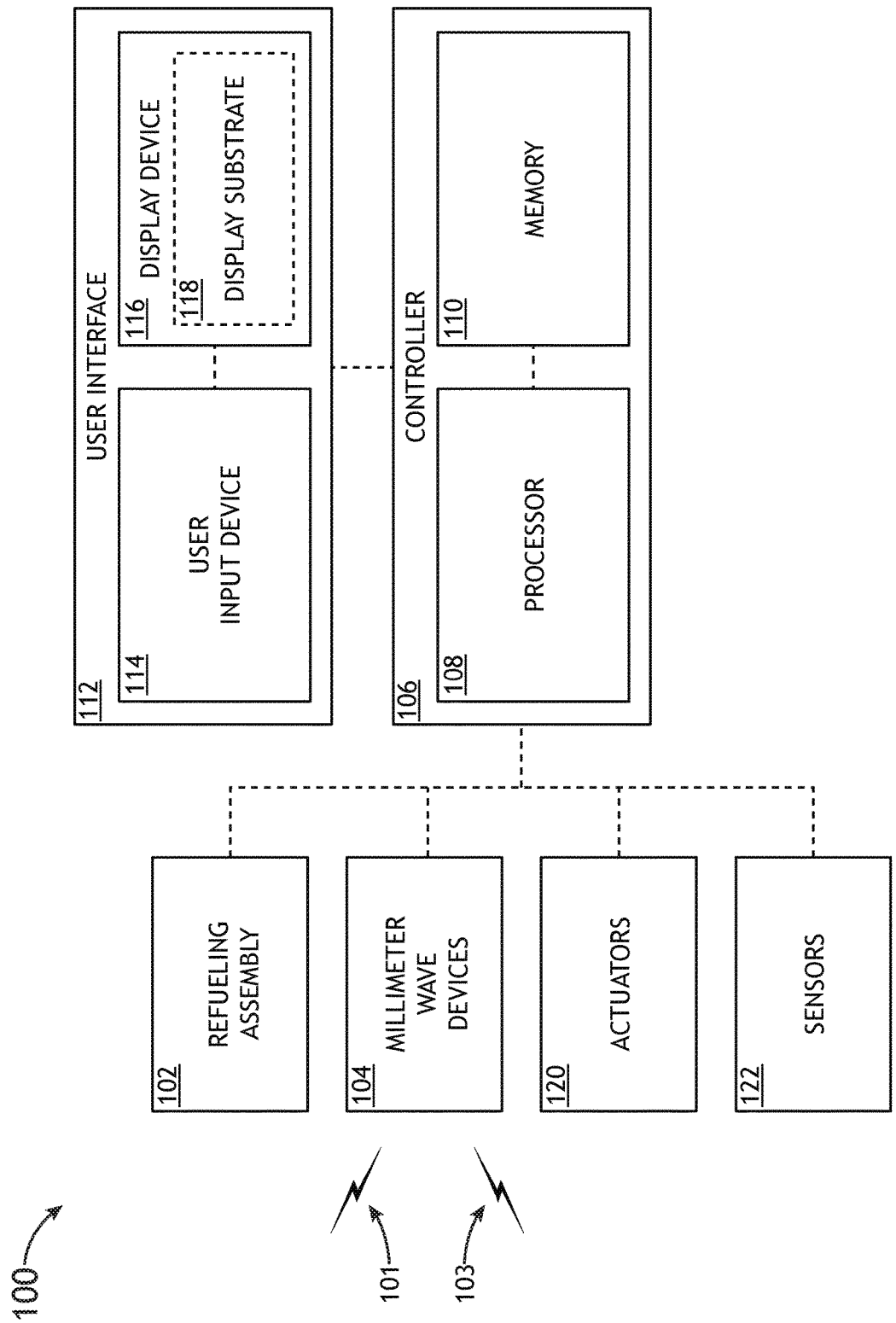
FIG. 1 illustrates a simplified block diagram of a situational awareness system, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

In the context of aircraft and airborne/aerial refueling, systems are required to determine distance and closure rate between a refueling assembly of a tanker aircraft and an aircraft to be refueled (e.g., receptacle of the aircraft to be refueled). For example, distances and closure rates between a tanker aircraft and an aircraft to be refueled may be directly measured using a variety of active emitter techniques, including light detection and ranging (LIDAR), radar, laser radar, and the like. However, these conventional techniques suffer from significant size, weight, power, and cost impact. Additionally, these active emitter techniques are easily detectible, and are therefore not suitable for covert, emissions control (EMCON) operations.

Accordingly, embodiments of the present disclosure are directed to a system and method which cure one or more of the shortfalls of previous approaches identified above. Embodiments of the present disclosure are directed to a situational awareness system for aerial refueling utilizing millimeter wave devices to determine distance, and closure rate, and changes in closure rate (e.g., acceleration, deceleration). Additional embodiments of the present disclosure are directed to a situational awareness system for distance and/or closure rate determination system suitable for use in the context of covert EMCON operations.

It is contemplated herein that embodiments of the present disclosure may provide a number of advantages over conventional situational awareness systems. For example, by utilizing millimeter wave techniques, the system and method of the present disclosure may significantly reduce the size, weight, and cost associated with situational awareness systems. Additionally, the millimeter wave techniques of the present disclosure have been found to exhibit improved performance in a wide range of applications and environments, including high altitudes, inclement weather conditions (e.g., storms, clouds, rain), and the like. In this regard, embodiments of the present disclosure may facilitate efficient and safe operations in a wide variety of applications, while simultaneously improving size, weight, power, and cost impacts. Furthermore, it is contemplated herein that embodiments of the present disclosure may facilitate situational awareness during covert operations, such as covert aerial refueling operations.

FIG. 1 illustrates a simplified block diagram of situational awareness system 100, in accordance with one or more embodiments of the present disclosure. In some embodiments, the situational awareness system 100 may be utilized in the context of aerial refueling. The situational awareness system 100 may include, but is not limited to, a refueling assembly 102, one or more millimeter wave devices 104, a controller 106, one or more processors 108, a memory 110, and a user interface 112. The user interface 112 may include a user input device 114 and a display device 116 including a display substrate. The situational awareness system 100 may further include, but is not limited to, one or more actuators 120 and one or more sensors 122.

In embodiments, the situational awareness system 100 of the present disclosure may be used to facilitate situational awareness during an aerial refueling operation. In this regard, the situational awareness system 100 may be implemented in the context of a tanker aircraft. For example, in some embodiments, the situational awareness system 100 may include a refueling assembly 102 disposed on/within a tanker aircraft, where the refueling assembly 102 is configured to deliver fuel from the tanker aircraft to a receptacle of an aircraft to be refueled. This may be further understood with reference to FIG. 2.

Figure 2A:
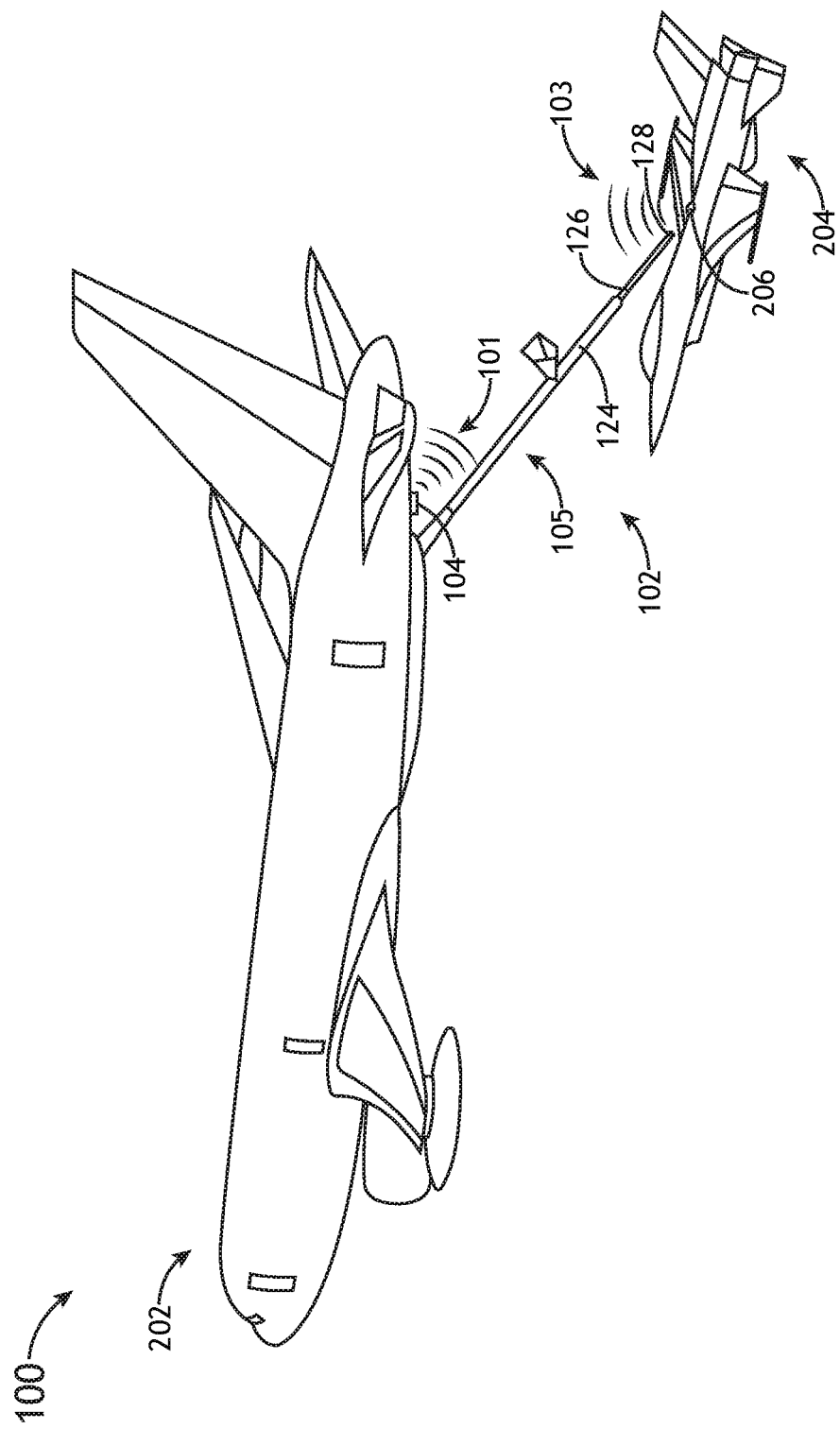
FIG. 2A illustrates an environmental view of a situational awareness system for aerial refueling, in accordance with one or more embodiments of the present disclosure.

FIG. 2A illustrates an environmental view of a situational awareness system 100 for aerial refueling, in accordance with one or more embodiments of the present disclosure.

In some embodiments, the refueling assembly 102 may include an armature 105. As shown in FIG. 2A, a tanker aircraft 202 may include one or more armatures 105 extending from the fuselage/body of the tanker aircraft 202. The one or more armatures 105 may be configured to extend from the fuselage of the tanker aircraft 202 in order to deliver fuel to a receptacle 206 of an aircraft to be refueled 204. In some embodiments, the armature 105 may include an armature body 124 and an extension member 126 including a distal end 128, where the distal end is configured to be coupled/disposed within the receptacle 206 of the aircraft to be refueled 204 in order to deliver fuel.

In embodiments, the situational awareness system 100 may include one or more actuators 120 communicatively coupled to the refueling assembly 102 (e.g., armatures 105). The actuators 120 may be configured to actuate one or more portions of the refueling assembly 102 (e.g., armature 105) in order to facilitate the aerial refueling operation. For example, the one or more actuators 120 may be configured to actuate the armature body 124 of the armature 102 out of and/or away from the fuselage of the tanker aircraft 202. By way of another example, the one or more actuators 120 may be configured to extend or "telescope" the extension member 126 of the armature 105 in order to dispose the distal end 128 of the extension member within the receptacle 206 of the aircraft to be refueled 204.

It is noted herein that much of the present disclosure is shown and described in the context of the situational awareness system 100 used for aerial refueling operations. However, this is not to be regarded as a limitation of the present disclosure, unless noted otherwise herein. In this regard, the inventive concepts of the present disclosure may be applied in any number of contexts/environments in which improved situational awareness is desirable. For example, inventive concepts of the present disclosure may be used in the context of robotics applications, spacecraft docking, and the like. It is further noted herein that, where the situational awareness system 100 is implemented in an aircraft environment, the embodiments of the present disclosure may be configured in accordance with avionics guidelines and/or standards put forth by, but not limited to, any flight certification agency or organization (e.g., Federal Aviation Administration (FAA), European Aviation Safety Agency (EASA)), any standards-setting agency or organization (e.g., American National Standards Institute (ANSI), Aeronautical Radio, Incorporated (ARINC), Radio Technical Commission for Aeronautics (RTCA)), or any other guidelines agency or organization.

In embodiments, the situational awareness system 100 includes one or more millimeter wave devices 104 (e.g., millimeter wave emitters, millimeter wave sensors). The millimeter wave devices 104 may include any millimeter wave devices known in the art including, but not limited to, scanning millimeter wave devices. The one or more millimeter wave devices 104 may be configured to transmit one or more emitter signals 101, and receive one or more reflected signals 103 reflected from an object of interest. For example, as shown in FIG. 2A, the one or more millimeter wave devices 104 may be configured to transmit one or more emitter signals 101 toward the aircraft to be refueled 204, and receive one or more reflected signals 103 reflected from the aircraft to be refueled 204. The one or more millimeter wave devices 104 may be configured to transmit emitter signals 101 with a selected output power and/or a selected emitter signal frequency within the band of radio frequencies of the electromagnetic spectrum associated with millimeter wave (mmW) applications. For example, the emitter signals 101 may include an emitter signal frequency between approximately 30 GHz and approximately 400 GHz.

Figure 2B:
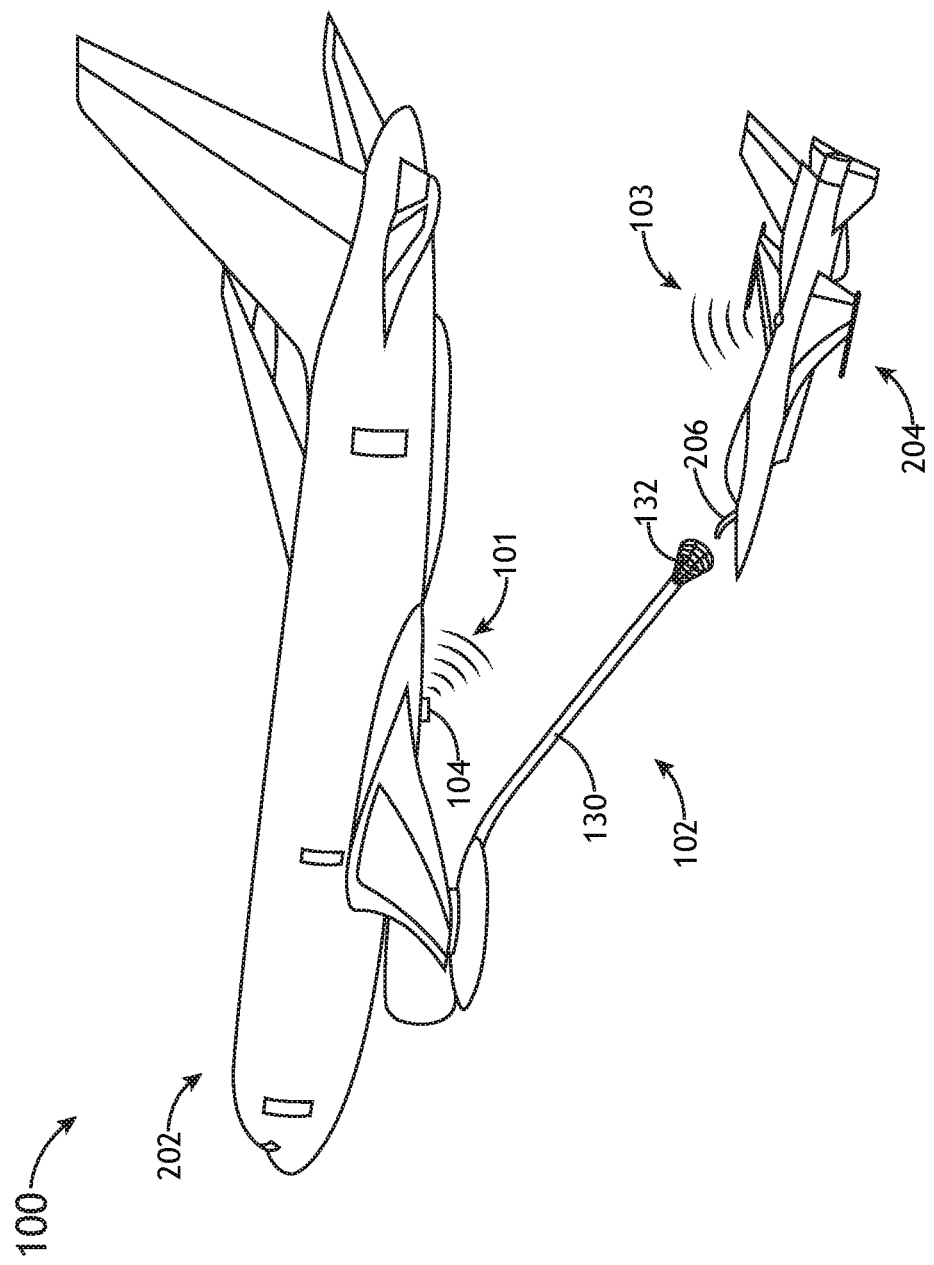
FIG. 2B illustrates an environmental view of a situational awareness system for aerial refueling, in accordance with one or more embodiments of the present disclosure.

FIG. 2B illustrates an environmental view of a situational awareness system 100 for aerial refueling, in accordance with one or more embodiments of the present disclosure. It is noted herein that any discussion associated with the situational awareness system 100 shown in FIG. 2A may be regarded as applying to the situational awareness system 100 shown in FIG. 2B, unless noted otherwise herein.

In additional and/or alternative embodiments, the refueling assembly 102 may include a hose/basket refueling assembly 102. For example, the refueling assembly 102 may include a hose 130 configured to extend from the tanker aircraft 202. The hose 130 may include a basket 132 coupled to the hose 130, wherein the basket 132 is configured to facilitate coupling of the refueling assembly to a receptacle 206 (e.g., probe, drogue) of the aircraft to be refueled 204.

In additional embodiments, the one or more millimeter wave devices 104 are communicatively coupled to the controller 106. The controller 106 may further be communicatively coupled to additional and/or alternative components of the situational awareness system 100 including, but not limited to, the refueling assembly 102, actuators 120, sensors 122, and user interface 112. The controller 106 may be communicatively coupled to various components of the situational awareness system 100 via any wireline or wireless communication technique known in the art.

The controller 106 may include one or more processors 108 and a memory 110, wherein the one or more processors 108 are configured to execute a set of program instructions stored in memory 110, the set of program instructions configured to cause the one or more processors 108 to carry out various steps/functions of the present disclosure. For example, in some embodiments, the controller 106 may be configured to: generate one or more control signals configured to cause the one or more millimeter wave devices 104 to transmit emitter signals 101; acquire one or more reflected signals 103 received by the one or more millimeter wave devices 104; determine a distance between the tanker aircraft 202 and the aircraft to be refueled 204 based on the one or more reflected signals 103; determine a closure rate between the tanker aircraft 202 and the aircraft to be refueled 204 based on the one or more reflected signals 103; determine a change in closure rate (e.g., acceleration, deceleration) between the tanker aircraft 202 and the aircraft to be refueled 204 based on the one or more reflected signals 103; and generate one or more control signals configured to cause the display substrate 118 to display at least one of a metric or image indicative of the determined distance, determined closure rate, or determined acceleration/deceleration. Each of these steps/functions will be addressed in turn.

In embodiments, the controller 106 may be configured to generate one or more control signals configured to cause the one or more millimeter wave devices 104 to transmit emitter signals 101 toward an object of interest. For example, in the context of an aerial refueling operation shown in FIGS. 2A-2B, the controller 106 may be configured to cause the millimeter wave devices 104 to transmit emitter signals 101 toward the aircraft to be refueled 204. By way of another example, in the context of space docking, the controller 106 may be configured to cause one or more millimeter wave devices 104 disposed on a spacecraft (e.g., space shuttle, un-manned shuttle, and the like) to transmit emitter signals 101 toward various components/structures of a docking station. It is contemplated herein that the millimeter wave devices 104 may be configured to transmit emitter signals 101 in order to measure distances, closure rates, and/or acceleration/deceleration values between any object of interest (e.g., aircraft to be refueled 204, docking station, and the like).

In some embodiments, the one or more millimeter wave devices 104 may be configured to transmit the emitter signals 101 along a single direction and/or a narrow range of angles in a selected direction. In additional and/or alternative embodiments, the one or more millimeter wave devices 104 may be configured to transmit the emitter signals 101 across a field of view. For example, as noted previously herein, the one or more millimeter wave devices 104 may include scanning millimeter wave devices 104 configured to transmit emitter signals 101 across a field of view, where the field of view includes at least a portion of an object of interest (e.g., aircraft to be refueled 204). It is contemplated herein that using scanning millimeter wave devices 104 to transmit emitter signals 101 across a field of view may be used to enhance resolution and/or situational awareness with respect to three-dimensional space. For example, by scanning the emitter signals 101 across a field of view, the situational awareness system 100 may be able to determine a plurality of distances between the millimeter wave devices 104 and the object of interest in order to generate 3D images, or a 3D model/depiction, of the aircraft to be refueled 204 with respect to the tanker aircraft 202. For instance, by scanning the emitter signals 101 across a field of view, the situational awareness system 100 may be able to determine a profile of a top surface of the fuselage of the aircraft to be refueled 204 in order to determine the position of the receptacle 206.

The one or more millimeter wave devices 104 may then be configured to receive one or more reflected signals 103 reflected from the object of interest. For example, referring again to FIG. 2A, the millimeter wave devices 104 may be configured to receive one or more reflected signals 103 reflected from the aircraft to be refueled 204. In embodiments, the controller 106 may be configured to acquire one or more reflected signals 103 received by the one or more millimeter wave devices 104. For example, the one or more millimeter wave devices 104 may be configured to receive the reflected signals 103 and transmit the reflected signals 103 and/or data associated with the reflected signals 103 to the controller 106.

In embodiments, the controller 106 may be configured to determine a distance between the tanker aircraft 202 and the aircraft to be refueled 204 based on the one or more reflected signals 103. For example, as shown in FIG. 2A, the controller 106 may be configured to determine a distance between the distal end 128 of the armature 105 and the receptacle 206 of the aircraft to be refueled 204. By way of another example, as shown in FIG. 2B, the controller 106 may be configured to determine a distance between basket 132 and the receptacle 206 of the aircraft to be refueled 204. It is noted herein that the controller 106 may be configured to determine a distance between the tanker aircraft 202 (e.g., refueling assembly 102) and the aircraft to be refueled 204 using any mathematical techniques, equations, or algorithms known in the art including, but not limited to, Doppler shift calculations, time-of-flight calculations, frequency-domain techniques with continuously-emitting millimeter wave devices 104, and the like. The controller 106 may be configured to store determined distances and time stamps associated with the determined distances in memory 110.

For example, the controller 106 and/or millimeter wave devices 104 may be configured to store a first set of one or more time stamps in memory indicating the time at which the one or more emitter signals 101 are transmitted (e.g., transmission time stamps). Similarly, the controller 106 and/or millimeter wave devices 104 may be configured to store a second set of one or more time stamps in memory indicating the time at which the one or more reflected signals 103 are received (e.g., reception time stamps). The controller 106 may then be configured to determine distances between the millimeter wave devices 104 and the object of interest based on a time-of-flight of the emitter signals 101/reflected signals 103 determined based on the first and second set of time stamps. For instance, differences between the second set of time stamps (reception time stamps) and the first set of time stamps (transmission time stamps) may be used to determine time-of-flight measurements of the emitter signals 101/reflected signals 103. The controller 106 may then be configured to convert time-of-flight measurements into distances.

In additional embodiments, the controller 106 may be configured to determine a closure rate and/or changes in closure rate (e.g., acceleration values, deceleration values) between the tanker aircraft 202 and the aircraft to be refueled 204 based on the one or more reflected signals 103. Closure rates and acceleration/deceleration values between the tanker aircraft 202 and an object of interest (e.g., aircraft to be refueled 204) may be expressed using any metric known in the art. Similarly, as noted herein with respect to distance determinations, closure rate calculations and acceleration calculations may be determined using any mathematical techniques, equations, or algorithms known in the art including, but not limited to, Doppler shift calculations, time-of-flight calculations, frequency-domain techniques, and the like. For example, the controller 106 may be configured to determine a plurality of distance calculations between the distal end 128 of the armature 105 and the receptacle 206 of an aircraft to be refueled 204 over a selected time period. The controller 106 may then be configured to determine one or more closure rates over the selected time period based on the plurality of determined distance measurements. The controller 106 may be configured to store determined closure rates and time stamps associated with the determined closure rates in memory 110.

The controller 106 may be configured to determine distance measurements and/or closure rate measurements at any regular or irregular interval. For example, the controller 106 may cause the millimeter wave devices 104 to continually transmit emitter signals 101 throughout an aerial refueling operation. In this example, the controller 106 may be configured to determine a distance, closure rate, and/or acceleration/deceleration value between a portion of the tanker aircraft 202 (e.g., refueling assembly 102, armature 105, basket 132) and the aircraft to be refueled 204 every tenth of a second, such that determined distances and determined closure rates are updated every tenth of a second.

The millimeter wave devices 104 may be disposed anywhere on and/or within the tanker aircraft 202. For example, as shown in FIGS. 2A-2B, the one or more millimeter wave devices 104 may be coupled to the fuselage of the tanker aircraft 202. For instance, the one or more millimeter wave devices 104 may be disposed on an exterior surface of the fuselage of the tanker aircraft 202. By way of another example, the one or more millimeter wave devices 104 may be coupled to the one or more armatures 105. For instance, the one or more millimeter wave devices 104 may be coupled to the armature body 124 and/or the distal end 128 of the armature 105. By way of another example, the one or more millimeter wave devices 104 may be disposed on/within the basket 132.

It is noted herein that the controller 106 may be configured to account for the location of the millimeter wave devices 104 in determining a distance between a portion of the tanker aircraft 202 and the object of interest (e.g., aircraft to be refueled 204). For example, as shown in FIG. 2A, the millimeter wave devices 104 may be disposed on the fuselage of the tanker aircraft 202. In order to determine acceleration values, distances, and/or closure rates between the distal end 128 of the armature 105 and the receptacle 206 of the aircraft to be refueled 204, the controller 106 may be configured to utilize both the received reflected signals 103 and distance/positional data of the millimeter wave devices 104 with respect to the distal end 128. Distance/positional data of the millimeter wave devices 104 with respect to the distal end 128 (or other portions of the tanker aircraft 202) may be stored in memory 110. For instance, the controller 106 may be configured to determine a distance between the millimeter wave devices 104 disposed on the fuselage of the tanker aircraft 202 and the receptacle 206. The controller 106 may then be configured to subtract a distance between the millimeter wave devices 104 and the distal end 128 (which is stored in memory 110) in order to determine a distance between the distal end 128 of the armature 105 and the receptacle 206.

As compared to conventional situational awareness systems based on LIDAR, radar, or laser radar, the situational awareness system 100 of the present disclosure may enable the determination of acceleration values, distance measurements, and closure rate measurements with a substantially reduced form factor. The reduced size and weight of the situational awareness system 100 may be particularly useful in the context of aviation, where size and weight considerations are a driving factor in manufacturing considerations.

In embodiments, the controller 106 may be configured to generate one or more control signals configured to cause the display substrate 118 to display at least one of a metric or image indicative of the determined distance, determined closure rate, and/or determined acceleration/deceleration value. For example, the user interface 112 including the display device 116 may be disposed within the tanker aircraft 202 in order to display one or more images and provide situational awareness to an operator of the tanker aircraft 202. Upon determining one or more distance measurements closure rates, and/or acceleration values, the controller 106 may be configured to generate one or more control signals configured to cause the display substrate 118 of the display device 116 to display at least one determined distance measurement, determined closure rate, or determined acceleration value to an operator of the tanker aircraft 202.

Determined distances and/or closure rates may be conveyed/displayed by the display substrate 118 using any techniques, characters, metrics, images, or graphics known in the art. For example, a determined distances and/or closure rates may be displayed on the display substrate 118 as numerical numbers. By way of another example, the display substrate 118 may be configured to illustrate a determined distance and/or closure rate via one or more images or graphics. This may be further understood with reference to FIG. 3.

Figure 3:
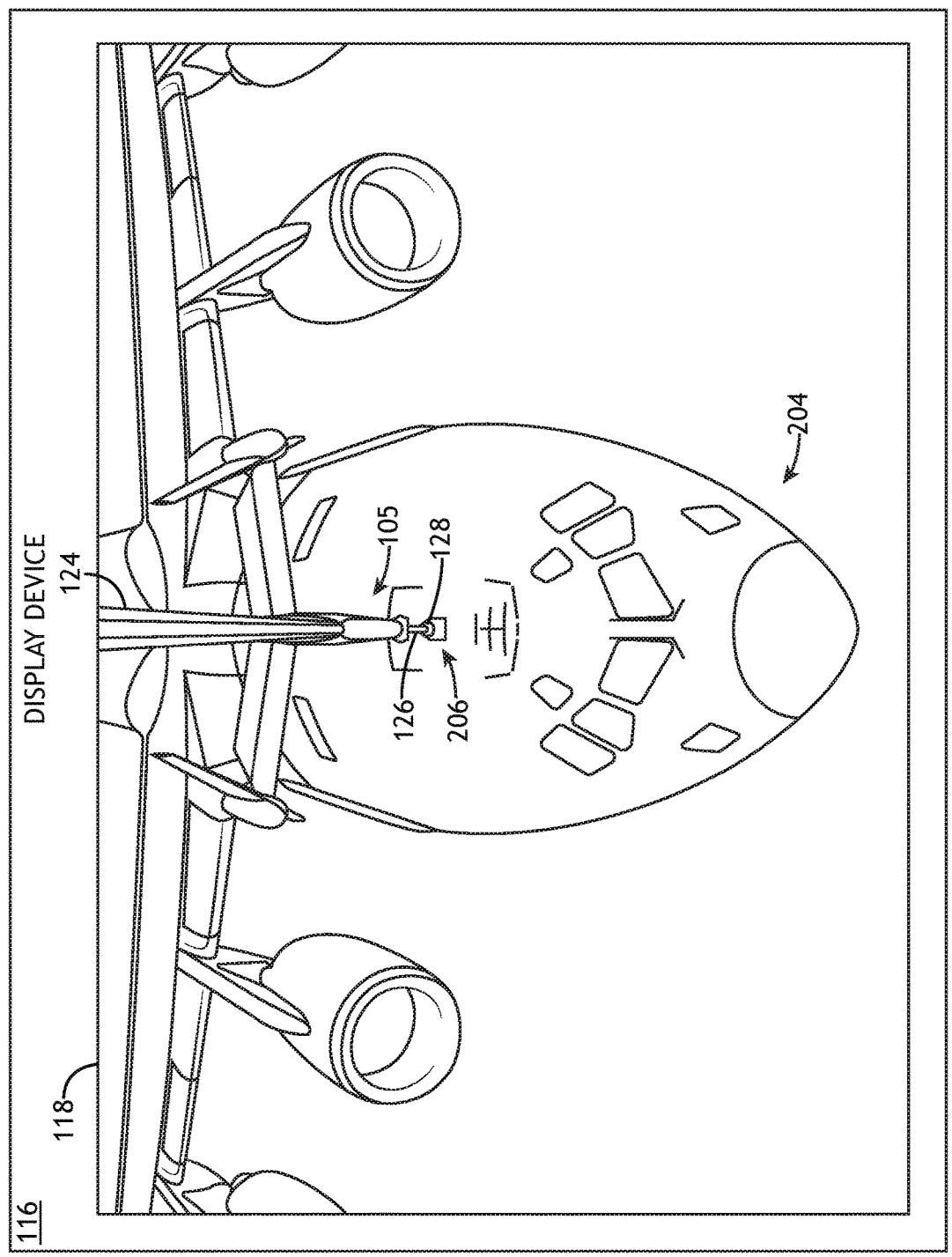
FIG. 3 illustrates a display substrate of a display device depicting an aerial refueling operation performed with a situational awareness system 100, in accordance with one or more embodiments of the present disclosure.

FIG. 3 illustrates a display substrate 118 of a display device 116 depicting an aerial refueling operation performed with a situational awareness system 100, in accordance with one or more embodiments of the present disclosure.

In some embodiments, in order to convey situational awareness data, the controller 106 may be configured to cause the display substrate 118 to display one or more images/graphics. Images/graphics displayed by the display substrate 118 may include real-world images of the aerial refueling area including the distal end 128, computer-generated graphics simulating the aerial refueling area, real-world images of the aerial refueling area overlaid with computer-generated graphics (e.g., augmented reality), and the like.

For example, as shown in FIG. 3, the controller 106 may be configured to cause the display substrate 118 to display a generated graphic of the aerial refueling area, including the refueling assembly 102 (e.g., armature 105) and receptacle 206 of the aircraft to be refueled 204. Based on the determined distances over time, the controller 106 may be configured to generate one or more control signals configured to cause the display substrate 118 to modify displayed images/graphics on display substrate 118 in order to convey/reflect determined distances. For instance, as the tanker aircraft 202 comes closer to the aircraft to be refueled 204, distances determined by the situational awareness system 100 may become smaller. In this regard, the controller 106 may be configured to cause images/graphics displayed on the display substrate 118 to illustrate the distal end 128 of the armature 105 to approach the receptacle 206. In this regard, an operator within the tanker aircraft 202 may be able to discern the distance between the distal end 128 of the armature and the aircraft to be refueled 204 based on the relative distance between the distal end 128 and the receptacle 206, as shown via the display substrate 118.

While the controller 106 and user interface 112 of the situational awareness system 100 are described as being positioned within the tanker aircraft 202, this is not to be regarded as a limitation of the present disclosure, unless noted otherwise herein. In this regard, one or more components of the situational awareness system 100 may be positioned in a location exterior to the tanker aircraft 202. For example, a controller 106 aboard the tanker aircraft 202 may be wirelessly coupled to one or more user interfaces 112 and/or display devices 116 located external to the tanker aircraft 202 (e.g., in another aircraft, terrestrial base station, mobile communication device, and the like). In this regard, the controller 106 may be configured to transmit data to the one or more user interfaces 112 external to the tanker aircraft 202 in order to provide situational awareness of the aerial refueling environment to users outside of the tanker aircraft 202. In the context of unmanned aircraft, a user interface 112 external to the tanker aircraft 202 may further be configured to transmit control signals, via user input device 114, in order to adjust one or more characteristics of the situational awareness system 100 remotely.

In some embodiments, the controller 106 may be configured to adjust one or more characteristics of the situational awareness system 100 based on determined distances, determined closure rates, and/or determined acceleration values. For example, in some embodiments, the controller 106 may be configured to generate one or more control signals configured to cause the one or more actuators 120 to actuate at least a portion of the refueling assembly 102 based at least in part on the determined distance. For instance, as the tanker aircraft 202 approaches the aircraft to be refueled 204, the controller 106 may be configured to cause actuators 120 to extend the hose 130/basket 132 from the tanker aircraft 202. By way of another example as the tanker aircraft 202 approaches the aircraft to be refueled 204, the controller 106 may be configured to cause actuators 120 to extend the armature 105 from the tanker aircraft and/or extend/telescope the extension member 126 from the armature body 124 of the armature 105. It is contemplated herein that the one or more actuators 120 may be configured to actuate components of the refueling assembly 102 in any manner known in the art in order to facilitate aerial refueling operations.

As noted previously herein, many conventional systems used to provide situational awareness utilize active emitter techniques which are easily and readily detected by unwanted receivers. Thus, conventional systems are typically not suited for covert operations, such as covert aerial refueling operations. Comparatively, it is contemplated herein that the situational awareness system 100 of the present disclosure may be used to facilitate situational awareness during covert operations. In particular, careful selection of emitter signal 101 output power and the utilization of atmospheric attenuation may be used in order to utilize the situational awareness system 100 in covert operations. This may be further understood with reference to FIG. 4.

Figure 4:
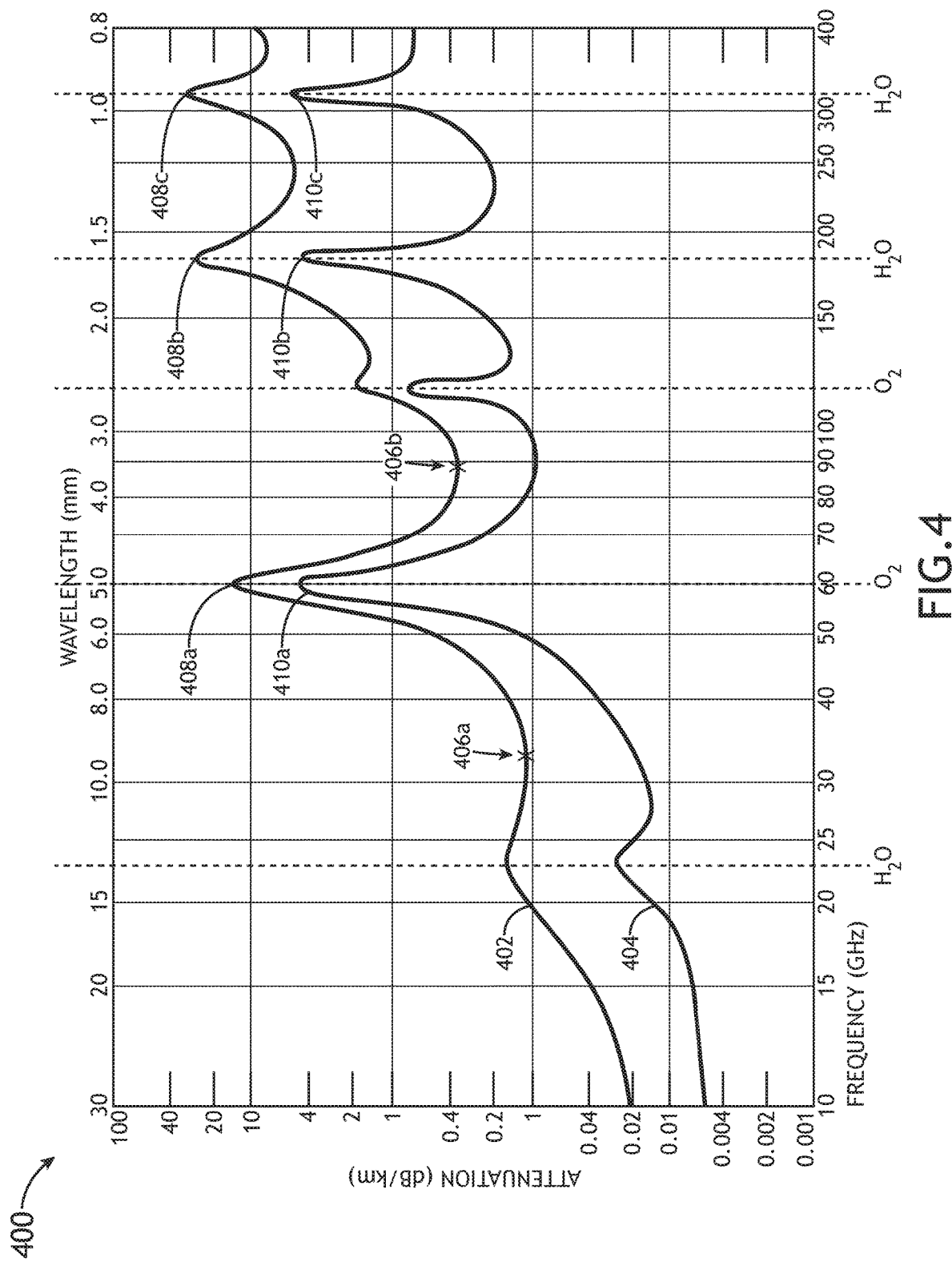
FIG. 4 is a graph illustrating atmospheric attenuation of millimeter wave signals, in accordance with one or more embodiments of the present disclosure.

FIG. 4 is a graph 400 illustrating atmospheric attenuation of millimeter wave signals, in accordance with one or more embodiments of the present disclosure. More particularly, graph 400 illustrates average atmospheric attenuation values (dB/km) against millimeter wave signal frequencies (GHz). Curve 402 illustrates average atmospheric attenuation vs. frequency for millimeter wave signals at sea level, and curve 404 illustrates average atmospheric attenuation vs. frequency for millimeter wave signals at an altitude of 4 km.

Signal attenuation and signal propagation distances are inversely proportional, with higher signal attenuation values leading to lower signal propagation distances. For example, points 406a and 406b on curve 402 illustrate frequencies which will achieve low atmospheric attenuation values, and therefore high propagation distances. Conversely, by way of another example, points 408a, 408b, and 408c on curve 402, as well as points 410a, 410b, and 410c on curve 404 illustrate frequencies which will achieve high atmospheric attenuation values, and therefore low propagation distances. In this regard, frequencies associated with points 408a, 408b, 408c, 410a, 410b, and 410c may be regarded as atmospheric attenuation frequencies.

In this regard, conventional situational awareness systems using active emitter techniques in both terrestrial vehicles and aircraft utilize emitter signal frequencies which exhibit low atmospheric attenuation values. For example, conventional situational awareness systems may select emitter frequencies of approximately 33 GHz (point 406a) or 88 GHz (point 406b) to ensure low attenuation, and therefore high propagation.

While emitter signal frequencies aimed at low attenuation/high propagation has enabled conventional situational awareness systems to increase the area/distance over which situational awareness data may be provided, doing so also increases the probability of unwanted detection during covert operations. Therefore, conventional situational awareness systems are typically ill-suited for covert operations.

Comparatively, embodiments of the present disclosure are directed toward the judicious selection of millimeter wave emitter signal 101 frequencies which will take advantage of atmospheric attenuation effects in order to provide situational awareness during covert operations. In embodiments, the controller 106 may be configured to generate one or more control signals configured to selectively adjust a frequency of the emitter signals 101. For example, in some embodiments, the controller 106 may be configured to cause the one or more millimeter wave devices 104 to transmit the emitter signals 101 with an emitter signal frequency corresponding to an atmospheric attenuation frequency of a surrounding environment of the tanker aircraft 202. For example, in the context of an aerial refueling operation conducted at an altitude of 4 km (curve 404), the controller 106 may be configured to cause the one or more millimeter wave devices 104 to transmit the emitter signals 101 with an emitter signal frequency corresponding to an atmospheric attenuation frequency associated with points 410a, 410b, or 410c.

It is noted herein that atmospheric attenuation frequencies may be determined by a number of factors including, but not limited to, altitude, temperature, pressure, atmospheric composition, water vapor composition, and the like. Atmospheric attenuation frequencies may further result from absorption frequencies and/or resonant frequencies of molecules within the atmosphere. For example, as shown in FIG. 4, atmospheric attenuation frequencies illustrated by points 408a and 410a may correspond to an absorption frequency of diatomic oxygen ($O_2$) within the atmosphere. By way of another example, atmospheric attenuation frequencies illustrated by points 408b, 408c, 410b, and 410c may correspond to an absorption frequency of water vapor ($H_2O$) within the atmosphere.

Accordingly, in some embodiments, the controller 106 may be configured to cause the one or more millimeter wave devices 104 to transmit emitter signals 101 with an emitter signal frequency corresponding to a resonant frequency and/or absorption frequency of oxygen ($O_2$) or a resonant frequency and/or absorption frequency of water vapor ($H_2O$). Other compounds within the atmosphere which may exhibit resonant/absorption frequencies which be utilized by the present disclosure may include, but are not limited to, carbon monoxide (CO), carbon dioxide ($CO_2$), nitrogen ($N_2$), and the like. In some embodiments, the controller 106 may be configured to selectively adjust an emitter signal 101 frequency dependent upon various operational modes (e.g., non-covert operation, covert operation).

In additional and/or alternative embodiments, the situational awareness system 100 may be configured to selectively adjust an output power of the one or more emitter signals 101. For example, in the context of regular (e.g., non-covert) operations, the one or more millimeter wave devices 104 may be configured to transmit the emitter signals 101 with high output power in order to increase the range and effectiveness of the situational awareness system 100. Subsequently, during a covert operation, the one or more millimeter wave devices 104 may be configured to transmit the emitter signals 101 with a reduced output power in order to reduce the likelihood of detection, and reduce the range at which unwanted receivers may detect the emitter signals 101.

In some embodiments, an operator may be able to selectively adjust an output power of the emitter signals 101. For example, an operator may input one or more input commands via the user input device 114. For instance, the one or more input commands may be indicative of a covert operation mode. The controller 106 may then be configured to receive one or more input commands from the user input device 114, and generate one or more control signals configured to cause the one or more millimeter wave devices 104 to selectively adjust an output power of the one or more millimeter wave devices 104 (e.g., selectively adjust an output power of emitter signals 101). For instance, when the one or more input commands are indicative of a covert operation mode, the controller 106 may selectively reduce an output power of the emitter signals 101.

It is noted herein that the propagation distance of emitter signals 101/reflected signals 103 may be dependent on any number of factors including, but not limited to, output power, temperature, pressure, altitude, humidity, water vapor composition, and the like. In this regard, in additional and/or alternative embodiments, the situational awareness system 100 may be configured to selectively adjust the output power of the millimeter wave devices 104/emitter signals 101 based on one or more characteristics of a surrounding environment of the situational awareness system 100.

In embodiments, as shown in FIG. 1, the situational awareness system 100 may include one or more sensors 122. The one or more sensors 122 may be disposed on and/or within the tanker aircraft 202, armature 102, and the like. The one or more sensors 122 may be configured to acquire sensor readings indicative of a surrounding environment of the situational awareness system 100 (e.g., tanker aircraft 202). The sensors 122 may include any type of sensor known in the art including, but not limited to, temperature sensors, pressure sensors, humidity sensors, composition sensors, and the like. In this regard, the sensors 122 may be configured to acquire sensor readings indicative of any characteristic of the surrounding environment including, but not limited to, temperature, a pressure, a composition, a water vapor density, an atmospheric absorption metric, or the like.

The one or more sensor readings acquired by the sensors 122 may be used to selectively adjust an output power of the millimeter wave devices 104/emitter signals 101 in order to enable sufficient situational awareness, while simultaneously preventing the situational awareness system 100 from being detectable beyond modest distances from the tanker aircraft 202.

For example, the sensors 122 may be configured to acquire one or more sensor readings indicative of one or more characteristics of the surrounding environment of the tanker aircraft 202, and the controller 106 may be configured to receive the one or more sensor readings. The controller 106 may then be configured to determine an output power of the one or more emitter signals 101 based on the one or more sensor readings. The controller 106 may be configured to determine/select an output power which is configured to cause the one or more emitter signals 101 to exhibit a power level below a selected power level threshold beyond a selected distance from the tanker aircraft. By selecting an output power which will cause the emitter signals 101 to have a power level below the selected power level threshold at a selected distance, the situational awareness system 100 may be configured to prevent emitter signals 101 from being detectable beyond the selected distance. After determining/selecting the output power, the controller 106 may be configured to generate one or more control signals configured to cause the one or more millimeter wave devices 104 to transmit the one or more emitter signals 101 with the selected output power.

It is noted herein that the one or more components of the disclosed system may be communicatively coupled to the various other components of the system in any manner known in the art. For example, the refueling assembly 102, millimeter wave devices 104, actuators 120, sensors 122, controller 106, and user interface 112 may be communicatively coupled to each other and other components via a wireline (e.g., copper wire, fiber optic cable, and the like) or wireless connection (e.g., RF coupling, IR coupling, WiFi, WiMax, 3G, 4G, 4G LTE, 5G, Bluetooth and the like).

In one embodiment, the one or more processors 108 may include any one or more processing elements known in the art. In this sense, the one or more processors 108 may include any microprocessor-type device configured to execute software algorithms and/or instructions. In one embodiment, the one or more processors 108 may consist of a desktop computer, mainframe computer system, workstation, image computer, parallel processor, or other computer system (e.g., networked computer) configured to execute a program configured to operate the situational awareness system 100, as described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors 108. In general, the term "processor" may be broadly defined to encompass any device having one or more processing elements, which execute program instructions from memory 110. Moreover, different subsystems of the situational awareness system 100 (e.g., refueling assembly 102, millimeter wave devices 104, actuators 120, sensors 122, controller 106, and user interface 112) may include processor or logic elements suitable for carrying out at least a portion of the steps described throughout the present disclosure. Therefore, the above description should not be interpreted as a limitation on the present disclosure but merely an illustration.

The memory 110 may include any storage medium known in the art suitable for storing program instructions executable by the associated one or more processors 108. For example, the memory 110 may include a non-transitory memory medium. For instance, the memory 110 may include, but is not limited to, a read-only memory (ROM), a random-access memory (RAM), a magnetic or optical memory device (e.g., disk), a magnetic tape, a solid-state drive and the like. In another embodiment, the memory 110 is configured to store data including, but not limited to, reflected signals 103, acquired sensor readings, determined distances, determined closure rates, and the like. It is further noted that memory 110 may be housed in a common controller housing with the one or more processors 108. In an alternative embodiment, the memory 110 may be located remotely with respect to the physical location of the processors 108, controller 106, and the like. In another embodiment, the memory 110 maintains program instructions for causing the one or more processors 108 to carry out the various steps described through the present disclosure.

In one embodiment, a user interface 112 is communicatively coupled to the controller 106. In one embodiment, the user interface 112 may include, but is not limited to, one or more desktops, tablets, smartphones, smart watches, or the like. In another embodiment, the user interface 112 includes a display device 116 used to display data of the situational awareness system 100 to a user. The display device 116 of the user interface 112 may include any display known in the art. For example, the display device 116 may include, but is not limited to, a liquid crystal display (LCD), an organic light-emitting diode (OLED) based display, or a CRT display. Those skilled in the art should recognize that any display device 116 capable of integration with a user interface 112 is suitable for implementation in the present disclosure. In another embodiment, a user may input selections and/or instructions responsive to data displayed to the user via a user input device 114 of the user interface 112.

Figure 5:
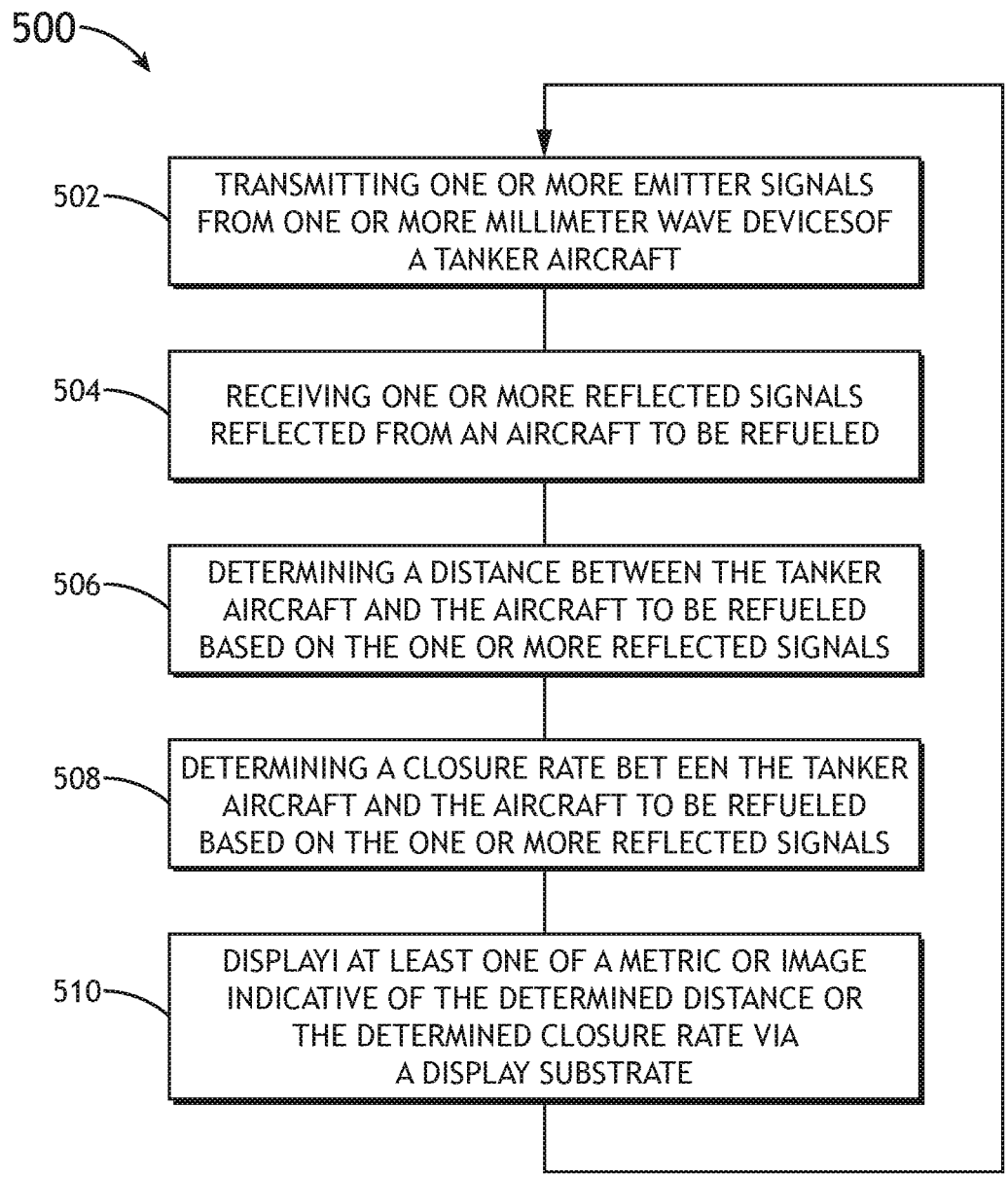
FIG. 5 illustrates a flowchart of a method for performing an aerial refueling operation, in accordance with one or more embodiments of the present disclosure.

FIG. 5 illustrates a flowchart of a method 500 for performing an aerial refueling operation, in accordance with one or more embodiments of the present disclosure. It is noted herein that the steps of method 500 may be implemented all or in part by system 100. It is further recognized, however, that the method 500 is not limited to the system 100 in that additional or alternative system-level embodiments may carry out all or part of the steps of method 500.

In a step 502, one or more emitter signals are transmitted from one or more millimeter wave devices of a tanker aircraft. For example, as shown in FIG. 2A, the controller 106 may be configured to cause the millimeter wave devices 104 to transmit emitter signals 101 toward the aircraft to be refueled 204.

In a step 504, one or more reflected signals reflected from an aircraft to be refueled are received. For example, referring again to FIG. 2A, the millimeter wave devices 104 may be configured to receive one or more reflected signals 103 reflected from the aircraft to be refueled 204. In embodiments, the controller 106 may be configured to acquire one or more reflected signals 103 received by the one or more millimeter wave devices 104. For example, the one or more millimeter wave devices 104 may be configured to receive the reflected signals 103 and transmit the reflected signals 103 and/or data associated with the reflected signals 103 to the controller 106.

In a step 506, a distance between the tanker aircraft and the aircraft to be refueled is determined based on the one or more reflected signals. For example, the controller 106 may be configured to determine a distance between the distal end 128 of the armature 105 and the receptacle 206 of the aircraft to be refueled 204. It is noted herein that the controller 106 may be configured to determine a distance between the tanker aircraft 202 (e.g., refueling assembly 102) and the aircraft to be refueled 204 using any mathematical techniques, equations, or algorithms known in the art including, but not limited to, Doppler shift calculations, time-of-flight calculations, and the like.

In a step 508, a closure rate between the tanker aircraft and the aircraft to be refueled is determined based on the one or more reflected signals. For example, the controller 106 may be configured to determine a plurality of distance calculations between the distal end 128 of the armature 105 and the receptacle 206 of an aircraft to be refueled 204 over a selected time period. The controller 106 may then be configured to determine one or more closure rates over the selected time period based on the plurality of determined distance measurements.

In a step 510, at least one of a metric or image indicative of the determined distance or the determined closure rate is displayed via a display substrate. For example, the user interface 112 including the display device 116 may be disposed within the tanker aircraft 202 in order to display one or more images and provide situational awareness to an operator of the tanker aircraft 202. Upon determining one or more distance measurements or one or more closure rates, the controller 106 may be configured to generate one or more control signals configured to cause the display substrate 118 of the display device 116 to display at least one determined distance measurement or determined closure rate to an operator of the tanker aircraft 202.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A situational awareness system for aerial refueling, comprising:
   one or more millimeter wave devices of a tanker aircraft, the one or more millimeter wave devices configured to:
      transmit one or more emitter signals toward an aircraft to be refueled; and
      receive one or more reflected signals reflected from the aircraft to be refueled;
   a display device disposed within the tanker aircraft, the display device including a display substrate configured to display one or more images; and
   a controller communicatively coupled to the one or more millimeter wave devices and the display device, the controller is further configured to:
      receive two or more sensor readings indicative of two or more characteristics of a surrounding environment of the tanker aircraft, wherein the two or more sensor readings are acquired by two or more sensors disposed on the tanker aircraft and include at least a temperature sensor reading and a composition sensor reading;
      determine an output power for the one or more emitter signals, based on the two or more sensor readings; and generate one or more control signals configured to cause the one or more millimeter wave devices to transmit the one or more emitter signals with the determined output power;

the controller including one or more processors and a memory, the one or more processors configured to:

determine a distance between a refueling assembly of the tanker aircraft and the aircraft to be refueled based on the one or more reflected signals; and generate one or more control signals configured to cause the display substrate to display at least one of a metric or image indicative of the determined distance.

2. The situational awareness system of claim 1, wherein the one or more emitter signals include an emitter signal frequency comprising at least one of an absorption frequency of oxygen (O2) or an absorption frequency of water vapor (H2O).

3. The situational awareness system of claim 1, wherein the two or more characteristics of the surrounding environment include at least three of a temperature, a pressure, a composition, a water vapor density, or an atmospheric absorption metric.

4. The situational awareness system of claim 1, wherein determining an output power of the one or more emitter signals comprises:

determining an output power configured to cause the one or more emitter signals to exhibit a power level below a selected power level threshold beyond a selected distance from the tanker aircraft.

5. The situational awareness system of claim 1, wherein the controller is further configured to:

receive one or more input commands from a user input device; and generate one or more control signals configured to cause the one or more millimeter wave devices to selectively adjust an output power of the one or more emitter signals.

6. The aerial refueling system of claim 1, wherein the controller is further configured to:

determine a closure rate between the tanker aircraft and the aircraft to be refueled based on the one or more reflected signals; and generate one or more control signals configured to cause the display substrate to display at least one of a metric or image indicative of the determined closure rate.

7. The situational awareness system of claim 1, wherein the refueling assembly is configured to deliver fuel from the tanker aircraft to a receptacle of the aircraft to be refueled.

8. The situational awareness system of claim 7, wherein the controller is further configured to:

generate one or more control signals configured to cause one or more actuators to actuate at least a portion of the refueling assembly based at least in part on the determined distance.

9. The situational awareness system of claim 1, wherein the one or more millimeter wave devices comprise a scanning millimeter wave sensor.

10. The situational awareness system of claim 1, wherein the one or more millimeter wave devices are coupled to a fuselage of the tanker aircraft.

11. The situational awareness system of claim 1, wherein the refueling assembly comprises an armature, and wherein the one or more millimeter wave devices are coupled to at least one of an armature body or a distal end of the armature.

12. The situational awareness system of claim 1, wherein the one or more emitter signals include an emitter signal frequency corresponding to an atmospheric attenuation frequency of a surrounding environment of the aircraft.

13. A situational awareness system comprising:

one or more millimeter wave devices of an aircraft, the one or more millimeter wave devices configured to:

transmit one or more emitter signals toward an object of interest; and receive one or more reflected signals reflected from the object of interest; and a controller communicatively coupled to the one or more millimeter wave devices, the controller is further configured to:

receive two or more sensor readings indicative of two or more characteristics of a surrounding environment of the aircraft, wherein the two or more sensor readings are acquired by two or more sensors disposed on the aircraft and include at least a temperature sensor reading and a composition sensor reading;

determine an output power for the one or more emitter signals, based on the two or more sensor readings; and generate one or more control signals configured to cause the one or more millimeter wave devices to transmit the one or more emitter signals with the determined output power;

the controller including one or more processors and a memory, the one or more processors configured to:

determine a distance between the aircraft the object of interest based on the one or more reflected signals;

determine a closure rate between the aircraft the object of interest based on the one or more reflected signals; and generate one or more control signals configured to cause a display substrate to display at least one of a metric or image indicative of the determined distance and the determined closure rate.

* * * * *